US006001903A

United States Patent [19]

Nakamae et al.

[11] Patent Number: 6,001,903

[45] Date of Patent: *Dec. 14, 1999

[54] SYNTHETIC RESIN POWDER

[75] Inventors: Masato Nakamae; Toshiaki Sato, both of Kurashiki, Japan

[73] Assignee: Kuraray Co., Ltd., Kurashiki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,601

[22] Filed: Sep. 13, 1996

[30] Foreign Application Priority Data

Sep. 26, 1995 [JP] Japan .................................... 7-246532

[51] Int. Cl.[6] ...................................................... C08K 3/00

[52] U.S. Cl. .................................. 524/3; 524/5; 524/425; 524/426; 524/430; 524/445; 524/451; 524/459; 524/493; 524/503; 525/57; 525/59; 526/202

[58] Field of Search .................................... 524/459, 503, 524/3, 5, 425, 426, 430, 445, 451, 493; 525/59, 57; 526/202

[56] References Cited

U.S. PATENT DOCUMENTS

| | | | |
|---|---|---|---|
| Re. 28,780 | 4/1976 | Bergmeister et al. | 524/459 |
| 4,048,416 | 9/1977 | Axen et al. | 526/9 |
| 4,565,854 | 1/1986 | Sato et al. | 526/214 |
| 4,638,024 | 1/1987 | Sato et al. | 524/22 |
| 4,699,950 | 10/1987 | Sato et al. | 525/185 |
| 4,912,184 | 3/1990 | Akasaki et al. | 525/59 |
| 5,061,761 | 10/1991 | Sato et al. | 525/329.8 |
| 5,308,910 | 5/1994 | Yuki et al. | 525/123 |
| 5,387,638 | 2/1995 | Nakamae et al. | 524/503 |
| 5,519,084 | 5/1996 | Pak-Harvey et al. | 524/503 |
| 5,703,156 | 12/1997 | Sauer | 524/802 |

FOREIGN PATENT DOCUMENTS

| | | |
|---|---|---|
| 4-185606 | 7/1992 | Japan . |
| 6-183805 | 7/1994 | Japan . |

OTHER PUBLICATIONS

Patent Abstracts of Japan, May 7, 1994, 06183805 A.

Patent Abstracts of Japan vol. 018, No. 163 (C–1181), Mar. 18, 1994 & JP–A–05 331214 (Kao Corp), Dec. 14, 1993, * abstract * & Database WPI Section Ch, Week 9403 Derwent Publications Ltd., London, GB; Class A18, AN 94–022928 A–* abstract*.

Patent Abstracts of Japan, vol. 016, No. 501 (C–0996), Oct. 16, 12992 & JP–A–04 185607 (Hoechst Gosei KK), Jul. 2, 1992, * abstract * & Database WPI, Section Ch, Week 9233, Derwent Publications Ltd., London, GB; Class A14, AN 92–272867 A–* abstract 8.

*Primary Examiner*—Judy M. Reddick
*Attorney, Agent, or Firm*—Oblon, Spivak, McClelland, Maier & Neustadt, P.C.

[57] ABSTRACT

There is disclosed a synthetic resin powder comprising a polymer made from an ethylenically unsaturated monomer or a diolefinic monomer and a polyvinyl alcohol chemically bonded through a sulfide bond at an end thereof to the surface of a particle of the polymer. Although the synthetic resin powder of the present invention can be in the form of powder during transportation, it can easily be dispersed in water by adding water thereto under stirring, because it is excellent in dispersibility in water and blocking resistance. The synthetic resin powder is excellent also in film forming properties, and thus can preferably be used as an admixture for a mortar, etc.

12 Claims, No Drawings

SYNTHETIC RESIN POWDER

BACKGROUND OF THE INVENTION

1. Field of the Invention

The present invention relates to a synthetic resin powder excellent in dispersibility in water.

2. Description of the Related Arts

An aqueous emulsion comprising an aqueous medium and polymer particles with small particle diameters dispersed therein has been employed in a variety of uses such as admixtures for cement or mortar, adhesives, binders for coating materials and the like. However, such an aqueous emulsion has involved the problems of a high transportation cost because of water as a dispersion medium contained in an amount of about 50% by weight, and disposal of the containers after use.

Under such circumstances, there is a demand for a synthetic resin powder which, although being in the form of powder during transportation, can easily be dispersed in water by adding water thereto under stirring at the time of use.

As a synthetic resin powder having dispersibility in water, there are known a vinyl ester polymer powder obtained by spray-drying an aqueous emulsion obtained through an emulsion polymerization of a vinyl ester monomer by the use of a polyvinyl alcohol (hereinafter abbreviated as "PVA") as a dispersant (disclosed in Japanese Patent Application Laid-Open No. 185606/1992); and a (meth)acrylic ester polymer powder and a diolefinic polymer powder each obtained by spray-drying an aqueous emulsion obtained through an emulsion polymerization of a (meth)acrylic ester monomer or a diolefinic monomer by the use of a low molecular weight surfactant as a dispersant.

However, any of the conventional synthetic resin powders has involved the problem of low dispersibility in water. In addition in the case of a vinyl ester polymer powder, there has been the problem of low alkali-resistance when used as an admixture for a mortar.

SUMMARY OF THE INVENTION

An object of the present invention is to provide a synthetic resin powder which is excellent in dispersibility in water and well suited to use as an admixture for a mortar, etc.

Intensive research and investigation were made by the present inventors in order to solve the above-mentioned problems. As a result, there have been found a synthetic resin powder which comprises a polymer made from an ethylenically unsaturated monomer or a diolefinic monomer and a polyvinyl alcohol chemically bonded through a sulfide bond at an end (preferably at only one end) thereof to the surface of a particle of said polymer; a synthetic resin powder obtained by drying an aqueous emulsion produced through an emulsion polymerization of an ethylenically unsaturated monomer or a diolefinic monomer in the presence of a polyvinyl alcohol having a mercapto group at an end (preferably at only one end) thereof; and an admixture for mortar which comprises said synthetic resin powder. The present invention has been accomplished on the basis of the foregoing finding.

DETAILED DESCRIPTION OF THE PREFERRED EMBODIMENTS

In the case of the synthetic resin powder according to the present invention, the polymer particle that becomes a dispersoid, when added to water, is the particle of a polymer made from an ethylenically unsaturated monomer or a diolefinic monomer.

As examples of the ethylenically unsaturated monomer, mention is made of olefins such as ethylene, propylene and isobutene; halogenated olefins such as vinyl chloride, vinylidene chloride, vinyl fluoride and vinylidene fluoride; vinyl esters such vinyl formate, vinyl acetate, vinyl propionate, vinyl versatate and vinyl pivalate; (meth)acrylic acid esters such as (meth)acrylic acid, methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, dodecyl (meth)acrylate and octadecyl (meth)acrylate; acrylamide series monomers such as acrylamide, methacrylamide, N-methylolacrylamide, N,N-dimethylacrylamide, acrylamide-2-methylpropanesulfonic acid and sodium salts thereof; nitriles such as acrylonitrile and methacrylonitrile; allyl compounds such as allyl acetate and allyl chloride; styrenic monomers such as styrene, α-methylstyrene, p-methylstyrenesulfonic acid and sodium salts thereof and potassium salts thereof; and N-vinylpyrrolidone.

As examples of the diolefinic monomer, mention is made of butadiene, isoprene and chloroprene.

One of these monomers is used alone or in combination with at least one other.

On the other hand, the PVA chemically bonded (graft bonded) through a sulfide bond at an end thereof to the surface of the particle of the above-mentioned polymer, when added to water, exhibits the function as a dispersant.

From the viewpoints of dispersibility in water of the synthetic resin powder and film strength thereof, the viscosity-average degree of polymerization (hereinafter abbreviated as degree of polymerization) of the PVA is preferably 100 or more, more preferably 200 or more, particularly preferably 500 or more; and the degree of polymerization of the PVA is preferably 5000 or less, more preferably 3500 or less, particularly preferably 2000 or less.

In the case where the particle of the aforesaid polymer is that of an acrylic ester polymer, the degree of polymerization of the PVA is preferably more than 500 and not more than 2500, more preferably more than 500 and not more than 1500.

On the other hand in the case where the particle of the aforesaid polymer is that of a diolefinic polymer, the degree of polymerization of the PVA is preferably 100 to 2000, more preferably 100 to 1500.

Whereas one kind of the PVA may be used alone, at least two kinds of the PVAs having a degree of polymerization different from each other can be used in combination so that the degree of polymerization of the combination falls within the above-mentioned range.

On the other hand, from the viewpoints of water solubility, etc. of the PVA, the degree of hydrolysis of the PVA is preferably 40 to 99.99 mol %, more preferably 50 to 99.9 mol %, particularly preferably 60 to 99.5 mol %.

As the PVA chemically bonded through a sulfide bond at an end thereof to the surface of the particle of the aforesaid polymer, preferable is a PVA originating from a PVA having a mercapto group at an end thereof. As a PVA having a mercapto group at an end thereof, it is preferably a PVA having a mercapto group at one end only thereof from the viewpoints of preventing formation of disulfide bond in the PVA itself and preserving the water solubility thereof.

The PVA having a mercapto group at only one end thereof can be obtained, for example, by hydrolyzing a polyvinyl ester obtained by polymerizing a vinyl ester monomer in the presence of a thiol acetate.

As examples of the vinyl ester monomer, mention is made of vinyl formate, vinyl acetate, vinyl propionate, vinyl valerate, vinyl caprylate, vinyl laurate, vinyl stearate, vinyl benzoate and vinyl pivalate. Of these, vinyl acetate is preferably from the industrial point of view.

The PVA may be copolymerized with an other comonomer. As examples of the comonomer, mention is made of olefins such as ethylene, propylene, 1-butene and isobutene; (meth)acrylic acid; (meth)acrylic acid esters such as methyl (meth)acrylate, ethyl (meth)acrylate, n-propyl (meth) acrylate, isopropyl (meth)acrylate, n-butyl (meth)acrylate, tert-butyl (meth)acrylate, 2-ethylhexyl (meth)acrylate, dodecyl (meth)acrylate and octadecyl (meth)acrylate; vinyl ethers such as methylvinyl ether, n-propylvinyl ether, isopropylvinyl ether, n-butylvinyl ether, isobutylvinyl ether, tert-butylvinyl ether, dodecylvinyl ether and stearylvinyl ether; nitriles such as acrylonitrile and methacrylonitrile; halogenated vinyls such as vinyl chloride, vinylidene chloride, vinyl fluoride and vinylidene fluoride; allyl compounds such as allyl acetate and allyl chloride; carboxyl group-containing compound and esters thereof such as fumaric acid, maleic acid, itaconic acid, maleic anhydride, phthalic anhydride, trimellitic anhydride and itaconic anhydride; sulfonic acid group-containing compounds such as ethylenesulfonic acid, allylsulfonic acid, methallysulfonic acid and 2-acrylamide-2-methylpropanesulfonic acid; vinylsilane compound such as vinyltrimethoxysilane; isopropenyl acetate; and 3-(meth)acrylamidepropyltrimethylammonium chloride. The content of these monomer units is preferably 5 mol % or less.

The synthetic resin powder (secondary particle) according to the present invention has an average particle diameter preferably in the range of 1 to 1000 $\mu$m, more preferably in the range of 2 to 500 $\mu$m. It can be dispersed into a particle (primary particle) having smaller particle diameter by being added to water under stirring.

The synthetic resin powder according to the present invention is obtained by drying an aqueous emulsion produced through an emulsion polymerization of the ethylenically unsaturated monomer or a diolefinic monomer in an aqueous medium in the presence of the PVA having a mercapto group at an end thereof.

As examples of an initiator to be used for the emulsion polymerization, mention is made of water-soluble initiators such as potassium bromate, potassium persulfate, ammonium persulfate, hydrogen peroxide and tert-butylhydroperoxide; and oil-soluble initiators such as azobis (isobutyronitrile) and benzoylperoxide. Of these is preferable the initiator which generates a radical only by a redox reaction with a mercapto group at an end of the PVA. One of these initiators is used alone or in a redox system in which the initiator is combined with a various kind of reducing agents. As a method for adding the initiator to the reaction system, mention is made of a method in which the initiator is collectively added in the initial stage of the emulsion polymerization and a method in which the initiator is continuously added with the progress of the polymerization.

The amount of the PVA to be used for emulsion polymerization is preferably 0.5 to 100 parts by weight, more preferably 1 to 50 parts by weight, particularly preferably 2 to 30 parts by weight per 100 parts by weight of the monomer. In the case where the amount of the PVA is less than 0.5 part by weight, the emulsion polymerization stability becomes lower, the mechanical stability and/or chemical stability of the aqueous dispersion which is obtained by adding the synthetic resin powder to water becomes lower, and the film strength becomes lower. On the other hand in the case where the amount of the PVA is more than 100 parts by weight, the viscosity increases during the emulsion polymerization, it becomes difficult to remove the heat of reaction, and the water resistance of films becomes lower.

As a method for adding the PVA to the reaction system, mention is made of a method in which the PVA is collectively added in the initial stage of the emulsion polymerization and a method in which part of PVA is added in the initial stage thereof and the balance is continuously added with the progress of the polymerization.

In the emulsion polymerization, the PVA having a mercapto group at an end thereof may be used in combination with a previously known surfactant of nonionic, anionic, cationic or ampholytic type, or a water-soluble polymer such as various PVAs or hydroxyethyl cellulose.

As a method for adding the monomer to the reaction system, there are usable a method in which the monomer is collectively added in the initial stage of the emulsion polymerization, a method in which part of the monomer is added in the initial stage thereof and the balance is continuously added with the progress of the polymerization and a method in which the monomer which has been emulsified in water in advance by the use of a dispersant is continuously added.

A chain transfer agent may be added in the emulsion polymerization. As the chain transfer agent, a compound having a mercapto group is preferable from the standpoint of chain transfer efficiency, which is exemplified by alkyl mercaptans such as n-octyl mercaptan, n-dodecyl mercaptan and tert-dodecyl mercaptan, 2-mercaptoethyl alcohol and 3-mercaptopropionic acid.

The amount of the chain transfer agent to be added is preferably 5 parts or less by weight per 100 parts by weight of the monomer. In the case where the amount of the chain transfer agent is more than 5 parts by weight, the emulsion polymerization stability becomes lower, the molecular weight of the polymer particles becomes remarkably lower, and the physical properties of the film become lower.

The synthetic resin powder according to the present invention is obtained by drying the aqueous emulsion produced through the above-mentioned emulsion polymerization. As drying method, mention is made of spray drying, heating drying, blast drying, lyophilizing, etc. Of these, spray drying is preferable. As spraying method, mention is made of disc system, nozzle system, etc. As the heat source for drying, mention is made of heated air, heated steam, etc. As drying conditions, it is preferable to set the size and type of a spray dryer, and the concentration, viscosity and flow rate of the aqueous emulsion so as to obtain sufficiently dried powder at drying temperature in the range of 40 to 150° C.

While the content of volatile matters in the synthetic resin powder is about equilibrium moisture content, it is preferably 3% or less by weight, more preferably 2% or less by weight.

The synthetic resin powder according to the present invention may be incorporated with a water-soluble additive in order to further enhance its dispersibility in water. The water-souble additive is preferably added to the aqueous emulsion, followed by spray drying. The amount of the water-soluble additive to be added is set to the extent that such addition does not exert adverse influence on the physical properties such as water resistance of the synthetic resin powder.

As examples of the water-soluble additive, mention is made of water-soluble polymer such as PVA, hydroxyethyl cellulose, methyl cellulose, starch derivative, polyvinyl pyrrolidone, polyethylene oxide, water-soluble alkyd resin, water-soluble phenolic resin, water-soluble urea resin, water-soluble melamine resin, water-soluble naphthalenesulfonic acid resin, water-soluble amino resin, water-soluble polyamide resin, water-soluble acrylic resin, water-soluble polycarboxylic acid resin, water-soluble polyester resin, water-soluble polyurethane resin, water-soluble polyol resin and water-soluble epoxy resin.

In addition, the synthetic resin powder according to the present invention is preferably incorporated with an antiblocking agent (anticaking agent) in order to further enhance its storage stability and dispersibility in water. The antiblocking agent may be added to the synthetic resin powder obtained by spray drying, followed by uniform mixing, but it is preferably added to the aqueous emulsion, followed by spray drying.

The anitiblocking agent is preferably an inorganic powder in the form of fine particle having an average particle diameter of 0.1 to 10 $\mu$m. As the inorganic powder, mention is made of calcium carbonate, clay, anhydrous silicic acid, aluminum silicate, white carbon, talc and alumina white. Moreover, an organic filler is usable. The amount of the antiblocking agent to be used is preferably 20% or less by weight, more preferably in the range of 0.2 to 10% by weight based on the synthetic resin powder.

The synthetic resin powder according to the present invention may be incorporated with a kind of additives in accordance with the purpose of use. The synthetic resin powder, when used as an admixture for a cement or mortar, is incorporated with an air-entraining agent (AE agent) a water-reducing agent, a fluidizing agent, a water-retaining agent, a thickening agent, a waterproofing agent or the like. The synthetic resin powder, when used for an adhesive, is incorporated with a viscosity improving agent, a water-retaining agent, a tackifying agent, a thickening agent or the like. The synthetic resin powder, when used for a paint binder, is incorporated with a viscosity improving agent, a thickening agent, a pigment-dispersing agent, a stabilizing agent or the like.

Although the synthetic resin powder of the present invention can be in the form of powder during transportation, it can easily be dispersed in water by adding water thereto under stirring, because it is excellent in dispersibility in water and blocking resistance. The synthetic resin powder is excellent also in film forming properties, and thus can preferably be used as an admixture for a mortar, etc.

The synthetic resin powder according to the present invention, when used as an admixture for a mortar, is incorporated therein in an amount of preferably 1 to 50 parts by weight, more preferably 2 to 30 parts by weight per 100 parts by weight of a cement contained in the mortar.

As a method for adding the synthetic resin powder to a mortar or cement, mention is made of a method comprising the steps of preparing in advance an aqueous dispersion of the synthetic resin powder and thereafter preparing a composition of an aqueous slurry of mortar and the aqueous dispersion thus prepared; a method in which the synthetic resin powder is added in the form of powder to an aqueous slurry of mortar at the time of its preparation; a method in which the synthetic resin powder is added in the form of powder to a powdery composition of cement and sand, etc. and thereafter a composition of an aqueous slurry of the mortar and the synthetic resin powder is prepared; and the like methods. Of these, the lastly described method is most preferable.

The composition of the aqueous slurry of motar obtained by adding the synthetic resin powder (admixture for mortar) according to the present invention is cured usually by a conventional method and is made into a molded product.

The aforesaid molded product is favorably used for the same use as that of the conventional mortar-molded product which is incorporated with the emulsion of acrylic acid ester polymer or the emulsion of styrene/butadiene copolymer (SBR).

In the following, the present invention will be described in more detail with reference to working examples, which however, shall not restrict the present invention thereto. In the working examples, part, parts and % are each based on weight.

Method for evaluating synthetic resin powder

The following methods were used for evaluating the physical properties of the aqueous dispersion obtained by adding 100 parts of ion-exchanged water to 100 parts of the synthetic resin powder and sufficiently stirring the resultant mixture with a stirrer.

Dispersibility in water

○: Uniformly dispersed (the ratio of 325 mesh-on being 20% or less)

Δ: Substantially dispersed, but dispersed particles being large in particle diameter (the ratio of 325 mesh-on being 30 to 50%)

χ: Poorly dispersed (the ratio of 325 mesh-on being 60% or more)

—: Synthetic resin power being unobtained

Film-forming properties

An evaluation was made of the properties of the films formed by casting the aqueous dispersion onto a glass plate and drying the cast liquid at 50° C.

○: Uniform and tough film being obtained

Δ: Film being obtained but brittle

χ: Uniform film being unobtained

—: Aqeuous dispersion of synthetic resin powder being unobtained

Antiblocking properties

An observation was made of the state of the synthetic resin powder which was placed in a vessel and allowed to stand for 10 days at 20° C. and 65% R.H. (relative humidity) under a load of 25 g/cm$^2$ ○: Blocking hardly occurred Δ: Partially agglomerated by blocking χ: Wholly agglomerated by blocking —: Synthetic resin powder being unobtained Average particle diameter A microscope observation was made on the synthetic resin powder, and the average particle diameter was measured from 100 particles (secondary particles).

The symbol "—" indicates that the synthetic resin powder was unobtained, since a stable aqueous emulsion was not obtained by emulsion polymerization.

Evaluation of performance as admixture for mortar

The following methods were used for evaluating the physical properties of molded products formed by preparing a mortar having the following composition and molding the same.

(Composition of mortar)

| | |
|---|---|
| Cement | 1 part |
| Synthetic resin powder | 0.1 part |
| Sand | 3.0 parts |
| Water | 0.6 part |

Slump value According to JIS A-1173
Flexural strength, compression strength, adhesion strength and water absorptivity according to JIS A-6203
Impact resistance Impact resistance was obtained by molding mortar into a square plate of 6 cm×6 cm×0.35 cm as a specimen, curing the plate at 20° C. and 65% R.H. (relative humidity) for 25 days and thereafter measuring the minimum drop height at which a dropped rigid sphere (67 g) destroyed the specimen.

EXAMPLE 1

A glass-made vessel equipped with a reflux condenser, a dropping funnel, a thermometer, a nitrogen blowing-in nozzle and a stirrer was charged with 8 parts of PVA having a mercapto group at only one end thereof (PVA-1: degree of polymerization of 1500, degree of hydrolysis of 96.0 mol %, mercapto group content of $1.5\times10^{-5}$ equivalent/g) and 90 parts of ion-exchanged water, and the PVA was completely dissolved in the water at 95° C. The resultant aqueous solution of the PVA was adjusted to pH=4 with dilute sulfuric acid, and incorporated, under stirring at 150 r.p.m., with 10 parts of vinyl acetate. Then, the reaction system was replaced with nitrogen, and the temperature in the system was raised to 60° C. Subsequently, emulsion polymerization was initiated by adding to the system, 5 parts of aqueous solution of tartaric acid having a concentration of 5% and thereafter continuously adding thereto aqueous solution of hydrogen peroxide having a concentration of 0.5%. To the system was continuously added 90 parts of vinyl acetate over a period of 2 hours. The polymerization was finished at the time when the concentration of the residual vinyl acetate reached as low as 1% after 3 hours from the start of the polymerization. As a result, there was obtained a stable emulsion of polyvinyl acetate having a solid concentration of 50.5%.

The mixture of 100 parts of the emulsion thus obtained and 100 parts of water, and fine powder of anhydrous silicic acid (average particle diameter of 2 μm) in an amount of 3% based on the solid content in the aforesaid emulsion, were sprayed separately and simultaneously into hot air at 100° C. and dried. As a result, there was obtained a synthetic resin powder having an average particle diameter of 60 μm. The results of evaluation of the powder are given in Tables 1 and 2.

Comparative Example 1

The procedure in Example 1 was repeated to produce emulsion except that the dispersant as given in Table 1 was used in place of PVA-1. Subsequently, the procedure in Example 1 was repeated to produce a synthetic resin powder except that the emulsion thus obtained was used. The results of evaluation of the powder are given in Tables 1 and 2.

TABLE 1

| | Dispersoid[1] (polymer) | Dispersant[2] | Average particle diameter of secondary particle (μm) | Dispersibility in water | Film-forming properties | Antiblocking properties |
|---|---|---|---|---|---|---|
| Example 1 | VAc | PVA-1 | 60 | ○ | ○ | ○ |
| Comparative Example 1 | VAc | PVA-2 | 65 | Δ | Δ | Δ |

Remarks
1) VAc: Vinyl acetate
2) PVA-1: Modified PVA having a mercapto group at only one end thereof (degree of polymerization of 1500, degree of hydrolysis of 96.0 mol %, mercapto group content of $1.5\times10^{-5}$ equi./g)
PVA-2: Unmodified PVA (degree of polymerization of 1500. degree of hydrolysis of 96.0 mol %)

TABLE 2

| | Physical properties of cement/mortar | | | | | |
|---|---|---|---|---|---|---|
| | Slump value | Flexural strength kg/cm$^2$ | Compression strength kg/cm$^2$ | Adhesion strength kg/cm$^2$ | Water absorptibity % | Impact resistance cm |
| Example 1 | 35 | 59 | 230 | 19.5 | 3.5 | 195 |
| Comparative Example 1 | 34 | 50 | 160 | 9.0 | 5.0 | 170 |

EXAMPLE 2

A glass-made vessel equipped with a reflux condenser, a dropping funnel, a thermometer, a nitrogen blowing-in nozzle and a stirrer was charged with 5 parts of PVA having a mercapto group at only one end thereof (PVA-3: degree of polymerization of 550, degree of hydrolysis of 88.3 mol %, mercapto group content of $3.3\times10^{-5}$ equivalent/g) and 90 parts of ion-exchanged water, and the PVA was completely dissolved in the water at 95° C. The resultant aqueous solution of the PVA was adjusted to pH=4 with dilute sulfuric acid, and incorporated, under stirring at 150 r.p.m., with 10 parts of methyl methacrylate, 10 parts of n-butyl acrylate and 0.1 part of n-dodecyl mercaptan. Then, the reaction system was replaced with nitrogen, and the temperature in the system was raised to 70° C. Subsequently, emulsion polymerization was initiated by adding to the system, 5 parts of aqueous solution of potassium persulfate having a concentration of 1%. To the system were continuously added the mixture of 40 parts of methyl methacrylate, 40 parts of n-butyl acrylate and 0.4 part of n-dodecyl mercaptan over a period of 2 hours. The polymerization was finished at the time when a conversion of 99.5% was achieved after 3 hours from the start of the polymerization. As a result, there was obtained a stable emulsion of methyl methacrylate/n-butyl acrylate copolymer having a solid concentration of 52.0%. Thereafter, the procedure in Example 1 was repeated to produce the synthetic resin powder except that the emulsion thus obtained was used. The results of evaluation of the powder are given in Tables 3 and 4.

EXAMPLES 3 TO 4

Comparative Examples 2 to 3

The procedure in Example 2 was repeated to produce emulsions except that the dispersant as given in Table 3 was used in place of PVA-3. Subsequently, the procedure in Example 2 was repeated to produce synthetic resin powders except that the emulsion thus obtained was used. The results of evaluation of the powder are given in Tables 3 and 4.

Remarks

1) MMA: methyl methacrylate
   n-BA: n-butyl acrylate
2) PVA-1: Modified PVA having a mercapto group at only one end thereof (degree of polymerization of 1500, degree of hydrolysis of 96.0 mol %, mercapto group content of $1.5\times10^{-5}$ equi./g)
   PVA-3: Modified PVA having a mercapto group at only one end thereof (degree of polymerization of 550, degree of hydrolysis of 88.3 mol %, mercapto group content of $3.3\times10^{-5}$ equi./g)
   PVA-4: Unmodified PVA (degree of polymerization of 550, degree of hydrolysis of 88.3 mol %)
   PVA- 5: Modified PVA having a mercapto group at only one end thereof (degree of polymerization of 510, degree of hydrolysis of 93.0 mol %, mercapto group content of $4.0\times10^{-5}$ equi./g)
   Nonionic surfactant : Nonipol 200 (Produced by Sanyo Chemical Industries Co., Ltd.)

TABLE 3

| | Dispersoid[1)] (polymer) | Dispersant[2)] | Average particle diameter of secondary particle (μm) | Dispersibility in water | Film-forming properties | Antiblocking properties |
|---|---|---|---|---|---|---|
| Example 2 | MMA, n-BA | PVA-3 | 60 | ○ | ○ | ○ |
| Example 3 | MMA, n-BA | PVA-1/ PVA-3 (1/1) | 65 | ○ | ○ | ○ |
| Example 4 | MMA, n-BA | PVA-5 | 60 | ○ | ○ | ○ |
| Comparative Example 2 | MMA, n-BA | PVA-4 | — | — | — | — |
| Comparative Example 3 | MMA, n-BA | nonionic surfactant | 50 | X | — | X |

TABLE 4

| | Physical properties of cement/mortar | | | | | |
|---|---|---|---|---|---|---|
| | Slump value | Flexural strength kg/cm² | Compression strength kg/cm² | Adhesion strength kg/cm² | Water absorptibity % | Impact resistance cm |
| Example 2 | 36 | 63 | 220 | 20.0 | 3.0 | 200 |
| Example 3 | 36 | 68 | 230 | 22.0 | 2.5 | 200 |
| Example 4 | 35 | 60 | 200 | 18.0 | 3.0 | 190 |
| Comparative Example 2 | — | — | — | — | — | — |
| Comparative Example 3 | 23 | 42 | 105 | 4.5 | 4.0 | 160 |

EXAMPLE 5

A pressure resistant autoclave equipped with a nitrogen blowing-in nozzle and a thermometer was charged with 100 parts of 4% aqueous solution of PVA having a mercapto group at only one end thereof (PVA-6: degree of polymerization of 350, degree of hydrolysis of 88.5 mol %, mercapto group content of $7.0\times10^{-5}$ equivalent/g). The resultant aqueous solution of the PVA was adjusted to pH=4 with dilute sulfuric acid, and incorporated with 60 parts of styrene and 1 part of tert-dodecyl mercaptan. Then, the reaction system was replaced with nitrogen, and the temperature in the system was raised to 70° C. by introducing under pressure 40 parts of butadiene from a pressure resistant measuring instrument. Subsequently, emulsion polymerization was initiated by introducing under pressure into the system, 10 parts of ammonium persulfate having a concentration of 2%. The pressure inside the autoclave was 4.5 kg/cm$^2$ before the start of polymerization, but was lowered to 0.3 kg/cm$^2$ after 20 hours from the start thereof, when the conversion to polymer was 99.2%.

As a result, there was obtained a stable emulsion of styrene/butadiene copolymer having a solid concentration of 49.1%. Thereafter, the procedure in Example 1 was repeated to produce the synthetic resin powder except that the emulsion thus obtained was used. The results of evaluation of the powder are given in Tables 5 and 6.

EXAMPLE 6

Comparative Examples 4 to 5

The procedure in Example 5 was repeated to produce emulsions except that the dispersant as given in Table 5 was used in place of PVA-6. Subsequently, the procedure in Example 5 was repeated to produce synthetic resin powders except that the emulsion thus obtained was used. The results of evaluation of the powder are given in Tables 5 and 6.

TABLE 5

| | Dispersoid[1] (polymer) | Dispersant[2] | Average particle diameter of secondary particle ($\mu$m) | Dispersibility in water | Film-forming properties | Antiblocking properties |
|---|---|---|---|---|---|---|
| Example 5 | St,BD | PVA-6 | 55 | ○ | ○ | ○ |
| Example 6 | St,BD | PVA-3 | 60 | ○ | ○ | ○ |
| Comparative Example 4 | St,BD | PVA-7 | — | — | — | — |
| Comparative Example 5 | St,BD | anionic surfactant | 40 | X | — | X |

Remarks
1) St: Styrene
BD: Butadiene
2) PVA-3: Modified PVA having a mercapto group at only one end thereof (degree of polymerization of 550, degree of hydrolysis of 88.3 mol %, mercapto group content of $3.3\times10^{-5}$ equi./g)
PVA-6: Modified PVA having a mercapto group at only one end thereof (degree of polymerization of 350, degree of hydrolysis of 88.5 mol %, mercapto group content of $7.0\times10^{-5}$ equi./g)
PVA-7: Unmodified PVA (degree of polymerization of 350, degree of hydrolysis of 88.5 mol %)
Anionic surfactant: Sundet BL(produced by Sanyo Chemical Industries Co., Ltd.)

TABLE 6

| | Physical properties of cement/mortar | | | | | |
|---|---|---|---|---|---|---|
| | Slump value | Flexural strength kg/cm$^2$ | Compression strength kg/cm$^2$ | Adhesion strength kg/cm$^2$ | Water absorptibity % | Impact resistance cm |
| Example 5 | 34 | 57 | 190 | 21.0 | 2.0 | 195 |
| Example 6 | 35 | 61 | 220 | 22.0 | 2.0 | 200 |
| Comparative Example 4 | — | — | — | — | — | — |
| Comparative Example 5 | 25 | 40 | 115 | 5.0 | 5.5 | 165 |

EXAMPLE 7

A pressure resistant autoclave equipped with a nitrogen blowing-in nozzle and a thermometer was charged with 80 parts of 6.25% aqueous solution of PVA having a mercapto group at only one end thereof (PVA-8: degree of polymerization of 800, degree of hydrolysis of 88.0 mol %, mercapto group content of $2.7\times10^{-5}$ equivalent/g). The resultant aqueous solution of the PVA was adjusted to pH=3.5 with dilute sulfuric acid, and incorporated with 80 parts of vinyl acetate. Then, the reaction system was replaced with nitrogen, and the temperature in the system was raised to 60° C. Subsequently, ethylene was introduced under pressure into the autoclave to reach a pressure of 45 kg/cm , 5 parts of 5% aqueous solution of Rongalite was added to the system, and 0.4% aqueous solution of hydrogen peroxide was continuously added to the system to initiate polymerization. The polymerization was finished at the time when the concentration of the residual vinyl acetate reached as low as 1% after 3 hours from the start of the polymerization. As a result, there was obtained a stable emulsion of ethylene/vinyl acetate copolymer having a solid concentration of 55.0%. Thereafter, the procedure in Example 1 was repeated to produce the synthetic resin powder except that the emulsion thus obtained was used. The results of evaluation of the powder are given in Tables 7 and 8.

Comparative Example 6

The procedure in Example 7 was repeated to produce a emulsion except that the dispersant as given in Table 7 was used in place of PVA-8. Subsequently, the procedure in Example 7 was repeated to produce a synthetic resin powder except that the emulsion thus obtained was used. The results of evaluation of the powder are given in Tables 7 and 8.

TABLE 7

| | Dispersoid[1)] (polymer) | Dispersant[2)] | Average particle diameter of secondary particle ($\mu$m) | Dispersibility in water | Film-forming properties | Antiblocking properties |
|---|---|---|---|---|---|---|
| Example 7 | Et,VAc | PVA-8 | 60 | ○ | ○ | ○ |
| Comparative Example 6 | Et,VAc | PVA-9 | 65 | Δ | Δ | Δ |

TABLE 8

| | Physical properties of cement/mortar | | | | | |
|---|---|---|---|---|---|---|
| | Slump value | Flexural strength kg/cm$^2$ | Compression strength kg/cm$^2$ | Adhesion strength kg/cm$^2$ | Water absorptibity % | Impact resistance cm |
| Example 7 | 36 | 57 | 200 | 18.5 | 3.0 | 195 |
| Comparative Example 6 | 35 | 52 | 175 | 12.5 | 3.5 | 180 |

What is claimed is:

1. A water dispersible synthetic resin powder composition which comprises a polymer and an antiblocking agent, said polymer being made from an ethylenically unsaturated monomer or a diolefin monomer and a polyvinyl alcohol chemically bonded through a sulfide bond at an end thereof to the surface of a particle of said polymer.

2. The synthetic resin powder according to claim 1 wherein the particle of said polymer is a particle of an acrylic ester polymer and said polyvinyl alcohol has an average degree of polymerization of 500 or more.

3. The synthetic resin powder according to claim 1 wherein the particle of said polymer is a particle of a diolefinic polymer and said polyvinyl alcohol has an average degree of polymerization of 100 or more.

4. A water dispersible synthetic resin powder composition obtained by adding an antiblocking agent to an aqueous emulsion produced through an emulsion polymerization of an ethylenically unsaturated monomer or a diolefin monomer in the presence of a polyvinyl alcohol having a mercapto group and then drying the aqueous emulsion added with the antiblocking agent.

5. An admixture for mortar which comprises said synthetic resin powder as set forth in any one of claims 1 to 4.

6. The synthetic resin powder according to claim 1, wherein the diolefin monomer is at least one selected from the group consisting of butadiene, isoprene and chloroprene.

7. The water dispersible composition according to claim 1, wherein the antiblocking agent is an inorganic powder.

8. The water dispersible composition according to claim 7, wherein the inorganic powder is at least one member selected from the group consisting of calcium carbonate, clay, anhydrous silicic acid, aluminum silicate, white carbon, talc and alumina white.

9. The water dispersible composition according to claim 7, wherein the inorganic powder is anhydrous silicic acid.

10. The water dispersible composition according to claim 4, wherein the antiblocking agent is an inorganic powder.

11. The water dispersible composition according to claim 10, wherein the inorganic powder is at least one member selected from the group consisting of calcium carbonate, clay, anhydrous silicic acid, aluminum silicate, white carbon, talc and alumina white.

12. The water dispersible composition according to claim 10, wherein the inorganic powder is anhydrous silicic acid.

* * * * *